United States Patent [19]

Fietzke

[11] Patent Number: 4,923,326
[45] Date of Patent: May 8, 1990

[54] CLAMPING RING FOR CLAMPING A MEMBER ON A SHAFT AND APPARATUS INCORPORATING THE CLAMPING RING

[75] Inventor: Günter Fietzke, Forest, Va.

[73] Assignee: Gebr. Hofmann GmbH & Co., Fed. Rep. of Germany

[21] Appl. No.: 308,822

[22] Filed: Feb. 10, 1989

[51] Int. Cl.⁵ .................................................. F16D 1/06
[52] U.S. Cl. ..................................... 403/371; 403/370; 403/372
[58] Field of Search ............... 403/371, 372, 365, 370, 403/291, 368, 366

[56] References Cited

U.S. PATENT DOCUMENTS

| | | | |
|---|---|---|---|
| 3,433,514 | 3/1969 | Feighofen | 403/370 |
| 3,578,364 | 5/1971 | Langen/Hessen | 403/370 |
| 3,995,967 | 12/1976 | Huller | 403/370 |
| 4,025,214 | 5/1977 | Spieth | 403/370 |
| 4,106,783 | 8/1978 | Glimpel | 403/370 X |
| 4,555,199 | 11/1985 | Maier et al. | 403/370 |
| 4,569,614 | 2/1986 | Yamauchi | 403/372 X |

Primary Examiner—Andrew V. Kundrat
Assistant Examiner—Peter M. Cuomo
Attorney, Agent, or Firm—Cushman, Darby & Cushman

[57] ABSTRACT

A clamping ring for clamping a member such as a rotor on a shaft comprises a ring member formed by a plurality of ring segment portions which are displaceable relative to each other in the peripheral direction of the ring member, and spring elements disposed in the respective gaps between adjacent ring segment portions, thereby connecting the ring segment portions together. The clamping ring is fitted into an opening in the member such as a rotor, and the clamping action is produced by a variation in the inside and/or outside diameter of the ring member, by virtue of the ring segment portions being displaced relative to each other in the peripheral direction only in the plane of the ring member.

20 Claims, 5 Drawing Sheets

4,923,326

CLAMPING RING FOR CLAMPING A MEMBER ON A SHAFT AND APPARATUS INCORPORATING THE CLAMPING RING

BACKGROUND OF THE INVENTION

A wide range of situations arise, which involve fixing a member such as a rotational member on for example a shaft in a piece of machinery. Typical examples of such a situation are those which involve fixing belt pulleys, gears and the like on a member such as a shaft having a cylindrical outside surface. For that purpose, it is possible to use clamping discs of a generally star-like shape, which are in the form of rings of hardened special spring steel, the rings being of a shallow conical configuration. The clamping discs of that kind are fitted into a bore or a recess in the rotational member to be secured on the shaft, the bore or recess having a cylindrical inside surface. By pressing the clamping disc towards the flattened condition, the outside diameter of the ring is enlarged and the inside diameter is reduced. As a result, the outside periphery of the ring is caused to bear against the cylindrical inside surface of the bore or recess and the inside periphery is caused to bear against the cylindrical outside surface of the shaft, thereby providing a suitable frictional locking effect as between the rotational member, the disc and the shaft. Those clamping discs are formed by radial slots in the spring steel material of the disc, the slots extending alternately from the outside peripheral edge and the inside peripheral edge thereof.

By virtue of the radial slots which impart the star-like configuration to those clamping discs extending from the inside peripheral edge and the outside peripheral edge respectively, the engagement surface areas for co-operating with the rotational member and for example the shaft respectively, and in particular the outside peripheral engagement area which co-operates with the cylindrical inside surface of the bore or recess in the rotational member, are relatively small. In addition, to produce the radial clamping effect, the clamping disc which, as mentioned, is of a shallow conical configuration, has to be pressed substantially flat, with an axially directed force being applied directly to the clamping disc.

SUMMARY OF THE INVENTION

An object of the present invention is to provide a clamping ring for force-lockingly clamping a member such as a rotor on a shaft, which is of a simplified design configuration and which affords engagement surfaces of considerable area both at its inside and at its outside periphery.

Another object of the present invention is to provide a clamping ring for fixing a member on a shaft which is simple to use and which effectively produces its clamping action without major mechanical complication in putting it into a clamping condition.

Still another object of the present invention is an apparatus for centeredly clamping a rotational member on a shaft, which can provide a secure frictional lock therebetween and which is simple to actuate.

In accordance with the principles of the present invention, these and other objects are attained by means of a clamping ring for force-lockingly clamping a member such as a rotor or the like on a shaft. For that purpose the clamping ring is fitted into an opening such as a bore or recess in the member to be clamped. The clamping ring includes a flat disc-like ring member comprising a plurality of ring segment portions extending from the inside periphery of the ring to the outside periphery thereof. Adjacent ring segment portions are connected together across the separating gaps therebetween by spring means disposed in said gaps in such a way that the segment portions are movable relative to each other only in the plane of the ring member in the peripheral direction thereof.

In a further aspect of the invention an apparatus for centeredly clamping a rotational member on a shaft of a machine comprises a centering cone adapted to be mounted on the shaft. The centering cone and a clamping ring in accordance with the invention, with its disc-shaped clamping ring member, are adapted to be fitted in mutually coaxial relationship into an opening such as a bore or recess in the rotational member. The apparatus further includes a clamping means adapted to apply a force to the ring member in the radial direction thereof by way of said centering cone, thereby to move said ring segment portions in the peripheral direction of the ring member against the force of said spring means.

As will be seen in greater detail from the following description of preferred embodiments, the invention provides a clamping ring having a generally flat disc-like ring member, the inside and outside peripheral surfaces of which are interrupted only by narrow separating gaps between the ring segment portions. That construction thus provides virtually continuous cylindrical inside and outside seating or engagement surfaces for co-operating with corresponding surfaces on the rotational member and the shaft on which the rotational member is to be fixed by affording frictional engagement when the clamping ring is put into its operative clamping condition.

The simple configuration of the clamping ring member comprising the ring segment portions and the spring means which are disposed in the gaps between same, such spring means being for example in the form of leaf spring portions, means that the clamping ring can be produced from a generally disc-like portion without involving a high level of expenditure. To produce the clamping ring, it is only necessary to remove the appropriate amounts of material by cutting machining or stamping, between the elongate spring means and the ring segment portions, thereby to form the separating gaps between the latter.

To produce the variation in diameter at the inside and outside peripheries of the clamping ring, there is no need for an axial force to be applied directly to the clamping ring member to produce deformation thereof in that axial direction. On the contrary, the variations in diameter at the inside and outside peripheries of the clamping ring member are produced purely by virtue of the mobility of the ring segment portions in the peripheral direction, as is afforded by virtue of the gaps between them.

When the clamping ring member according to the invention is used in the apparatus for centeredly clamping a rotational member on a shaft in a piece of machinery, the centering cone acts on the inside or outside periphery of the clamping ring member, with the cone and the ring member being arranged in coaxial relationship on the shaft. If the outside diameter of the clamping ring is to be increased, the centering cone acts against the inside periphery of the ring member while if a reduction in the diameter of the clamping ring is required, the centering cone acts on the outside periphery of the ring member. If the centering cone acts directly on the inside periphery or the outside periphery of the ring member, then the inside peripheral surface or the outside peripheral surface respectively of the ring member is desirably of a correspondingly conical or tapering configuration, to match the cone configuration. If a clamping chuck is disposed between the centering cone and the inside periphery or the outside periphery respectively of the ring member, then the inside peripheral surface or the outside peripheral surface respectively of the ring member may be cylindrical.

The clamping ring according to the invention and the apparatus according to the invention are suitable for a wide variety of purposes, for example for clamping rotary members of all kinds, more specifically for example pump rotors, jet rotors, rotors which have to be balanced, for fixing them on the shaft of a balancing machine, and the like. For that purpose the rotors may have openings in the form of blind bores or bores which extend therethrough, for receiving the clamping ring and the centering-clamping apparatus.

Further objects, features and advantages of the present invention will be apparent from the following description of preferred embodiments.

DESCRIPTION OF THE PREFERRED EMBODIMENTS

Figures 1A, 1B:
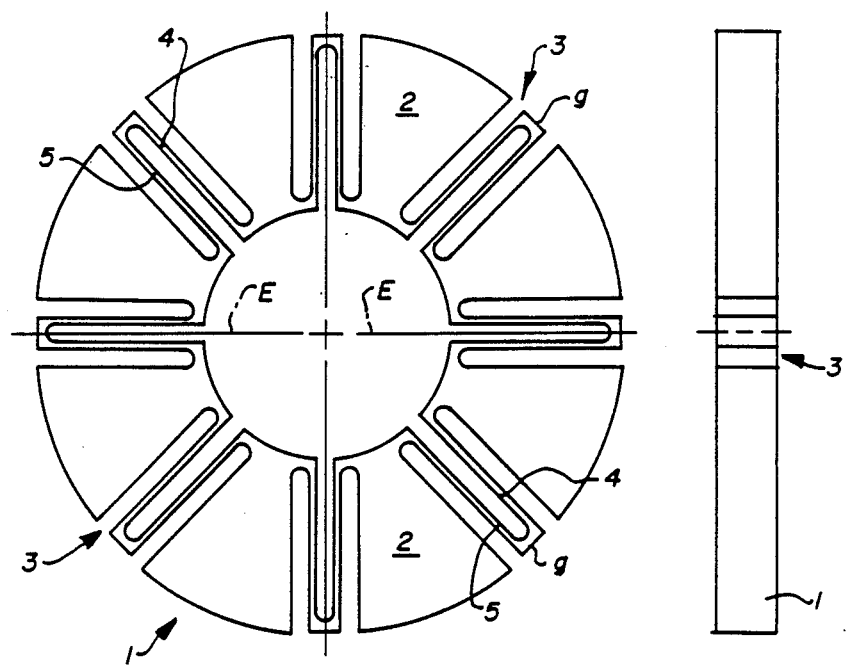
FIG. 1a is a plan view of a first embodiment of a clamping ring according to the invention.
FIG. 1b is a side view of the clamping ring shown in FIG. 1a, FIG. 2a is a plan view of a second embodiment of the clamping ring according to the invention.

Referring firstly to FIGS. 1a and 1b, shown therein is an embodiment of a clamping ring according to the invention, comprising a generally flat disc-like clamping ring member 1 comprising ring segment portions 2 which are connected together by way of spring elements 4 and 5. As can be clearly seen from FIG. 1a, the ring segment portions 2 extend from the inside periphery of the ring member 1 to the outside periphery thereof and are separated from each other in the peripheral direction of the ring member by narrow separating gaps indicated at 3. The spring elements 4 and 5 are disposed in the separating gaps 3. In the illustrated embodiment the spring elements 4 and 5 are in the form of leaf or blade springs which are connected together to define a generally U-shaped configuration, with the closed end of the U-shape facing radially outwardly. The spring elements 4 and 5, which form the limbs of the U-shape, extend in a radial direction or parallel to the radial direction, and are arranged in parallel relationship with each other. The outward ends of each two adjacent spring elements 4 and 5 are connected together by a connecting portion as indicated at 9, which is in alignment with the outside peripheral surface of the respective ring segment portions 2 which are connected together by the spring elements 4 and 5. The other, inward, ends of the two adjacent spring elements 4 and 5 are disposed at the inside periphery of the ring member where they are connected to the respectively adjacent ring segment portions 2. In that way the ring segment portions are interconnected by way of the respective pairs of spring elements 4 and 5.

As shown in FIG. 1a, the two spring elements 4 and 5 are parallel and symmetrical with respect to respective planes E extending radially through the centre of the clamping ring. The planes E extend normal to the plane of the drawing in FIG. 1a.

Figures 2A, 2B:
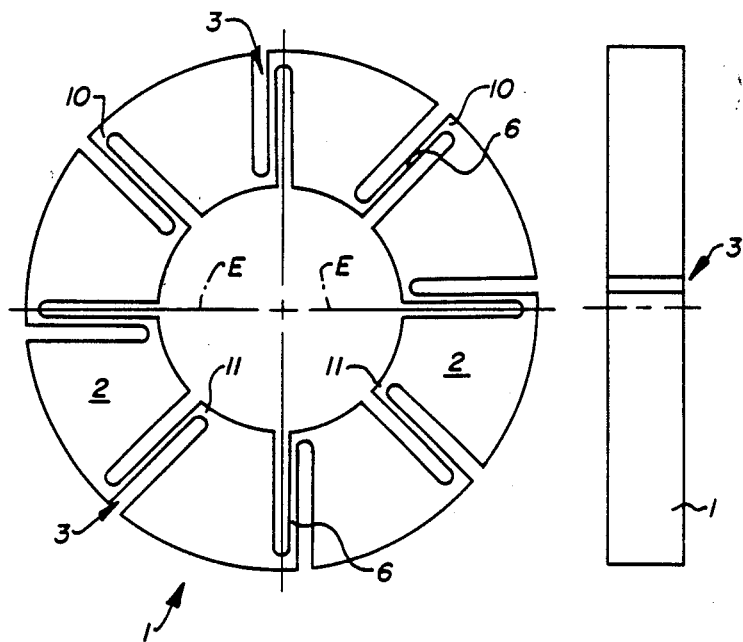
FIG. 2b is a side view of the clamping ring shown in FIG. 2a, FIG. 3 is a view of a detail from the embodiment shown in FIG. 2.

Reference will now be made to FIGS. 2a and 2b showing a further embodiment of the clamping ring which again comprises a generally flat disc-shaped ring member 1. The ring member 1 is made up of the ring segment portions 2 and spring elements 6 which interconnect adjacent ring segment portions 1.

The spring elements 6 are again disposed in gaps 3 between adjacent ring segment portions 2. The spring elements 6 are also in the form of leaf or blade springs and extend parallel to the planes E passing radially through the middle of the clamping ring member 1. In the embodiment shown in FIGS. 2a and 2b, each gap 3 accommodates only one spring element 6 which is disposed parallel to the respective plane E. In contrast to the configuration of the embodiment shown in FIGS. 1a and 1b, the embodiment of FIGS. 2a and 2b involves an asymmetrical spring arrangement relative to the respective plane E. As viewed in the clockwise direction in FIG. 2a, each spring element 6 occurs in front of the respective plane E. It is however also possible for the spring elements 6 to be arranged on the other side of the respective plane E, that is to say after that plane, once again as viewed in the clockwise direction in FIG. 2a.

The outward end of each spring element 6 which, as mentioned, extends parallel to the radial direction indicated by the respective plane E, is connected to the respective ring segment portion which follows it in the clockwise direction, by a respective connecting portion 10 which is disposed at the outside periphery of the ring member 1. The inward end of each spring element 6 is connected to the respective other ring segment portion 2, which is thus in front of it as viewed in the clockwise direction, by a connecting portion as indicated at 11 in FIG. 2a, which is disposed at the inside periphery of the ring member 1. Thus, each two adjacent ring segment portions 2 are resiliently connected together by way of a respective spring element 6 connected by its inward end at the inside periphery of the ring member to the one ring segment portion and at its outward end at the outside periphery of the ring member to the other ring segment portion.

Both in the embodiment shown in FIGS. 1a and 1b and in the embodiment shown in FIGS. 2a and 2b, the ring segment portions 2 are connected by way of the spring elements 4, 5 and 6 respectively in such a way as to be movable relative to each other only in the plane of the ring member 1, in the peripheral direction thereof. There is no possibility of the ring segment portions 2 moving substantially in the axial direction of the ring member 1.

Figure 3:
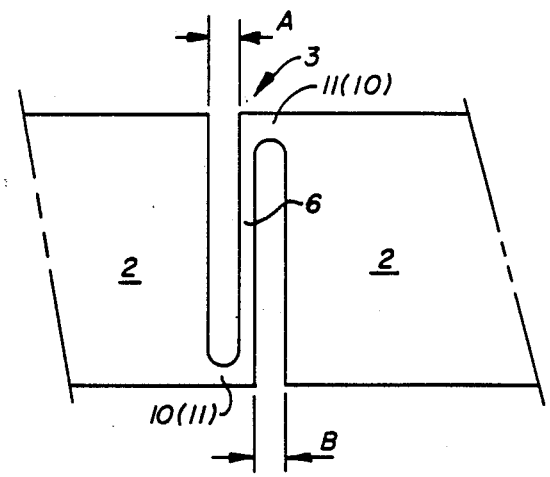
Figure 4:
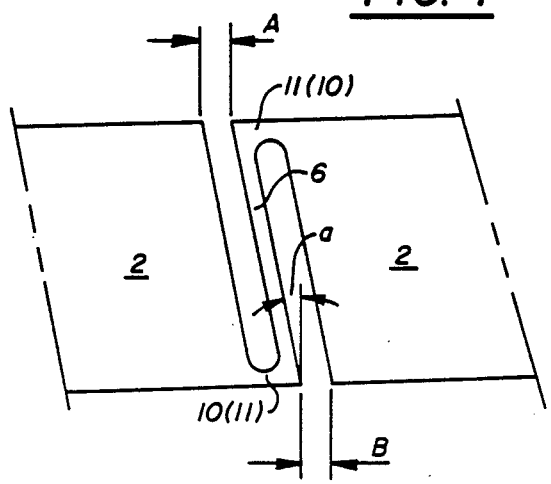
FIG. 4 is a view of a detail from a modified form of the embodiment shown in FIG. 2.

Reference will now be made to the construction shown in FIG. 3 and a modified construction as shown in FIG. 4 to illustrate the way in which that mobility of the ring segment portions 2 in the peripheral direction of the ring member 1 can produce a variation in the inside diameter of the ring member at the inside periphery thereof and the outside diameter at the outside periphery.

FIG. 3 shows a part of the embodiment of FIGS. 2a and 2b, in the region of one of the gaps 3 between two adjacent ring segment portions 2. For the sake of simplicity, to illustrate the mode of operation of the invention, the view in FIG. 3 is shown in a straight line. The invention makes use of the fact that, in the case of the ring member 1, when there is a movement of the ring segment portions 2 in the peripheral direction of the ring member 1, that produces a variation in the inside and outside diameters of the ring. If it is assumed that the separating gap 3 is made up of the two spaces A and B shown in FIG. 3, and the ring member 1 comprises n ring segment portions 2, then the following relationship shows the connection between the variation in diameter $\Delta s$ and the variations in the respective spaces A and B, as denoted by $\Delta A$ and $\Delta B$:

$$\Delta A = \Delta B = \frac{\Delta s \cdot \pi}{n}$$

If for example a force is applied by means of a centering cone to the inside periphery of the ring member 1 to produce an increase in the diameter thereof, the ring segment portions 2 of the embodiments shown in FIGS. 1 and 2 move away from each other in the peripheral direction of the ring, that is to say the two openings A and B forming the gap 3 are increased in size by $\Delta A$ and $\Delta B$ respectively. In accordance with the foregoing relationship, that provides an increase in diameter both at the inside periphery and at the outside periphery of the ring member 1, and that increase in diameter results in a member such as a rotor being forcibly locked or clamped on a shaft on which it is to be mounted, as will be described in greater detail hereinafter with reference to FIGS. 5 through 7.

By virtue of the bore or recess in the rotor, in which the ring member 1 is disposed for clamping the rotor on the shaft, having a cylindrical inside peripheral surface, the increase in the diameter of the ring member which is produced by the movement of the ring segment portions 2 is restricted. That means that all the ring segment portions 2 are uniformly pressed against the cylindrical inside surface of the bore or recess in the rotor to be clamped in position, as can also be seen from the views of the clamping apparatuses in FIGS. 5 and 6.

Figure 7:
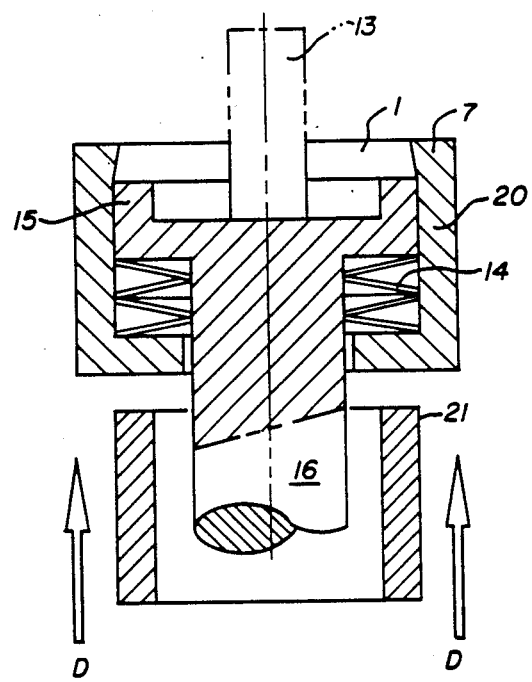
FIG. 7 shows a third embodiment of a clamping apparatus.

If a radially inwardly directed force is applied to the outside periphery of the ring member, for example by means of a suitable centering cone, as shown in FIG. 7, the respective ring segment portions 2 are moved towards each other, thus resulting in a reduction in the size of the openings A and B, by $\Delta A$ and $\Delta B$ respectively, which in turn results in a reduction in the diameter of the ring member. That radially inwardly directed movement is limited by virtue of a cylindrical outside surface against which the clamping ring is pressed by way of its inside peripheral surface. The cylindrical outside surface in question may be, for example, the cylindrical outside surface of a rotor to be clamped, as indicated at 13 in FIG. 7.

FIG. 4 is a view of part of a modified form of the embodiment shown in FIG. 2. Unlike the embodiment of FIG. 2, the construction shown in FIG. 4 has spring elements 6 which in particular are in the form of leaf or blade springs which are disposed at a small angle as indicated by a in FIG. 4 relative to the radial direction or the respective plane E. The angle a may be for example 30 minutes of angle. In that construction, in the clamping operation, the thrust force which acts in the spring element contributes to the clamping force. Bending moments which occur in the region of the peripherally extending connecting portions 10 and 11 between the ends of the spring elements 6 and the ring segment portions 2 are force-lockingly carried at the surfaces of the members to be clamped, against which the surfaces of the ring member 2 bears.

In the clamped condition the clamping ring member 1 bears with its seating or engagement surfaces provided both at the inside periphery and at the outside periphery of the ring member, against the oppositely disposed surfaces of the members which are to be force-lockingly clamped. If the deforming force for moving the clamping ring member into the clamping condition is caused to act at the inside periphery of the clamping ring, then the diameter of the ring is increased in the desired manner; while if the force is caused to act at the outside periphery of the ring member, that results in a reduction in the diameter of the clamping ring.

In the embodiment shown in FIG. 4 the spring element 6 is inclined through the angle a towards the left in FIG. 4, relative to a radial direction. It is also possible for the spring element 6 to be arranged in a position of being inclined by the angle a towards the right in FIG. 4, relative to the radial direction. The appropriate angle of inclination will be selected and the force for producing the deformation of the clamping ring will be caused to act at the outside or inside periphery of the ring member 1, depending on whether the aim is to produce a reduction or an increase in the inside and/or outside diameter of the clamping ring.

Figure 5:
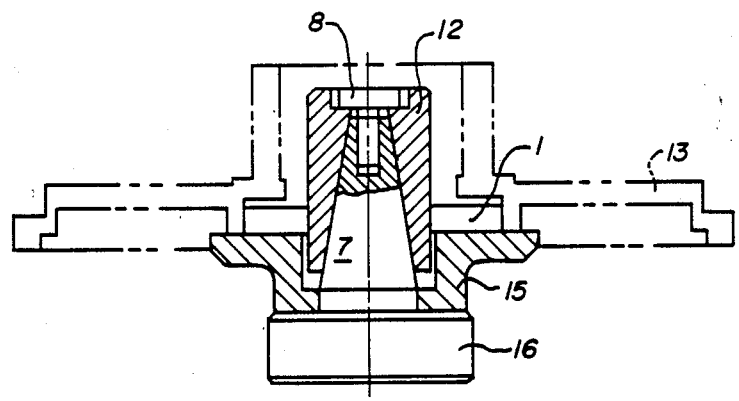
FIG. 5 shows a first embodiment of a clamping apparatus using a clamping ring according to the invention.
Figure 6:
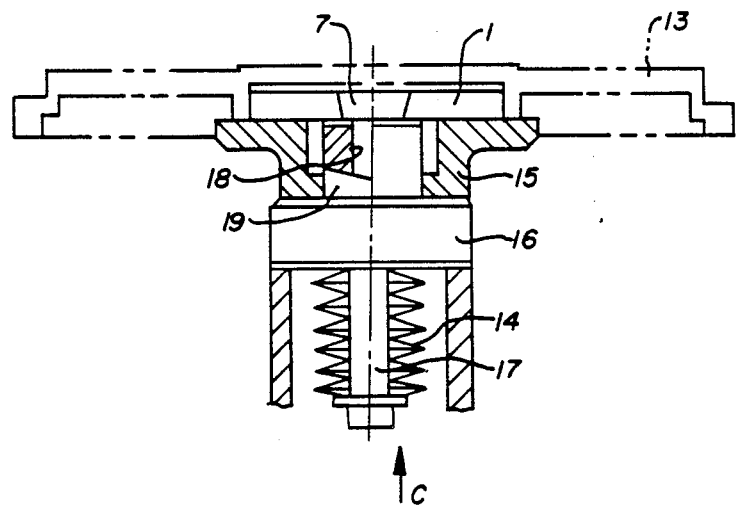
FIG. 6 shows a second embodiment of a clamping apparatus using a clamping ring according to the invention.

Reference will now be made to FIGS. 5 through 7 showing embodiments of apparatuses for centeredly clamping a rotational member on for example a shaft.

In the construction shown in FIG. 5, a centering cone 7 acts on the inside periphery of the ring member 1 of the clamping ring a described above with reference to FIGS. 1 through 4, by way of a clamping chuck arrangement 12 which is of known construction and which can be expanded in diameter. In the FIG. 5 embodiment the peripheral surface of the ring member 1 may be cylindrical and may bear against the cylindrical outside surface of the clamping chuck arrangement 12. The outside peripheral surface of the ring member 1 is also cylindrical and bears against a cylindrical inside surface of a bore in the rotor 13 which is to be clamped in position.

The clamping means used is in the form of a clamping screw 8 which is screwed into the centering cone 7. When the clamping screw 8 is screwed into the centering cone 7 the clamping chuck arrangement 12 is pushed on to the centering cone 7 and the outside diameter of the clamping chuck arrangement 12 is increased whereby the outside peripheral surface of the clamping chuck arrangement 12 is pressed against the inside peripheral surface of the ring member 1 and thus the outside diameter of the ring member 1 is also increased, thereby clamping the rotor 13 in position.

In the FIG. 5 embodiment the centering cone 7 is fixed on a mounting shaft 16 of a machine such as a balancing machine. To clamp the rotor 13 in position on the shaft 16, the rotor 13 and the ring member 1 bear against a support flange 15 carried on the shaft 16. For that purpose the flange 15 can be pushed over the centering cone 7.

Referring now to FIG. 6, in the embodiment illustrated therein the centering cone is indicated at 7 and bears with its conical outside surface directly against the conical inside peripheral surface of the clamping ring member 1. The outside peripheral surface of the ring member 1 is cylindrical and bears against a cylindrical inside peripheral surface of a recess in the rotor 13 which is to be clamped in position on the shaft 16.

The construction shown in FIG. 6 illustrates a clamping apparatus which is suitable for an automatic machine. The clamping apparatus in this case can be screwed on to the mounting shaft 16 which is of a hollow construction. The centering cone 7 on which a clamping bar 17 is formed is pressed by means of plate springs 14 into the correspondingly conical inside periphery of the ring member 1. For that purpose the bar 17 is fitted through a suitable bore 18 in a fitment member 19 disposed at the end face of the shaft 16, and projects into the hollow part of the shaft 16. In the hollow part of the shaft 16 the plate springs 14 act as a clamping means on the bar 17 and thus also on the centering cone which is thereby pressed against the peripheral surface of the ring member 1 to produce an increase in the diameter thereof.

Upon axial displacement of the centering cone 7 in a downward direction, a radially outwardly directed force is applied to the conical inside peripheral surface of the ring member 1, and that force results in the outside diameter of the ring member 1 being increased.

To release the clamping effect, the plate springs 14 are compressed in the direction indicated by an arrow C in FIG. 6 for example by pneumatically or hydraulically applying a force to the bar 17, whereby the centering cone 7 is removed from the ring member 1 in the direction indicated by the arrow C.

In both the embodiments of FIGS. 5 and 6, that produces an increase in the outside periphery of the ring by virtue of displacement as indicated at ΔA and ΔB in FIGS. 3 and 4 of the ring segments portions 2 in the peripheral direction relative to each other, thus producing a condition of firm frictional engagement with the cylindrical inside peripheral surface of the opening in the rotor 13.

In the embodiment shown in FIG. 7 a bar-like rotor 13, for example a shaft, is clamped in position on the mounting shaft 16. The ring member 1 has a circular cylindrical inside peripheral surface which is applied to the rotor 13 to be clamped in position on the shaft 16. At its outside periphery the ring member 1 has a conical peripheral surface. In the clamping operation, an annular centering cone 7 cooperates with the tapering outside peripheral surface on the ring member 1, with the annular centering cone 7 being provided on the inside of a cup-shaped clamping member 20. For the purposes of actuating the centering cone 7 or the clamping member 20 carrying same, the arrangement has clamping means in the form of plate springs 14 which urge the centering cone 7 in the direction in which it produces its clamping force on the ring member 1.

For the purposes of releasing the clamping action, a ring 21 can be moved in the direction indicated by the two arrows D in FIG. 7, thereby entraining the clamping member 20. The ring 21 can be moved in that way by hydraulic or pneumatic means, manually or in some other fashion. The rotor 13 can then be released from the ring member 1. In this embodiment also the ring member 1 bears against a support flange 15 which is formed on the shaft 16.

It will be appreciated that the above-described embodiments of the present invention have been set forth solely by way of example and illustration of the principles thereof and that various modifications and alterations may be made therein without thereby departing from the spirit and scope of the invention.

What is claimed is:

1. A clamping ring for clamping a rotating member relative to a drive member comprising:
a ring member having an outer periphery, a hollow interior defining an inner periphery and a plurality of spaced apart segments extending between the inner and outer periphery of the ring member, each of the plurality of segments being separated by generally radially extending gaps with adjacent ones of the segments being interconnected by at least one resilient member disposed in the gaps, each of the segments being movable in a generally radial direction, the inner periphery comprising an inner clamping surface and the outer periphery comprising an outer clamping surface so that the clamping ring is operable by a radially applied force.

2. A clamping ring as set forth in claim 1 wherein the resilient member is a spring element having two opposing ends each being respectively connected to adjacent segments.

3. A clamping ring as set forth in claim 2 wherein the spring element is a blade spring.

4. A clamping ring as set forth in claim 2 wherein the spring element comprises first and second blade springs arranged in parallel relationship with each other and connected together in a substantially U-shaped configuration.

5. A clamping ring as set forth in claim 4 wherein the first and second blade springs are connected to said segments adjacent the inner periphery.

6. A clamping ring as set forth in claim 1 wherein the resilient member is connected to the segments at at least one of the inner and outer peripheries of the ring member.

7. A clamping ring as set forth in claim 1 wherein the segments and the resilient members are integrally formed as a one piece structure.

8. A clamping ring as set forth in claim 1 wherein the resilient member is an elongate spring element extending substantially in the radial direction of the spring member.

9. A clamping ring as set forth in claim 1 wherein the resilient member is an elongate spring element disposed at an inclined angle relative to the radial direction of the ring member.

10. A clamping ring as set forth in claim 9 wherein the angle of inclination is about 30 minutes of angle.

11. An apparatus for clamping a rotating member relative to a drive member comprising:
a clamping ring, the clamping ring comprising a ring member having a hollow interior defining an inner and outer periphery and a plurality of spaced apart segments extending between the inner and outer periphery of the ring member, each of the plurality of segments being separated by generally radially extending gaps with adjacent ones of the segments being interconnected by at least one resilient member disposed in the gaps, each of the segments being movable in a generally radial direction, the inner periphery comprising an inner clamping surface and the outer periphery comprising an outer clamping surface so that the clamping ring is operable by a radially applied force; and operating means operatively associated with the clamping ring for applying a radial force to the ring member to connect the rotating member to the drive member.

12. An apparatus as set forth in claim 11 wherein the operating means comprises a conical member having a conical surface for operatively engaging with the clamping ring to apply a radial force.

13. An apparatus as set forth in claim 12 wherein the conical surface is adapted to engage the outer periphery of the clamping ring.

14. An apparatus as set forth in claim 12 wherein the conical surface is adapted to engage the inner periphery of the clamping ring.

15. An apparatus as set forth in claim 12 wherein said operating means further includes means mounted between the conical surface and the clamping ring for establishing the operating relationship therebetween.

16. An apparatus as set forth in claim 12 wherein the operating means further includes a conical member actuating means for moving the conical member between a first engaged position and a second disengaged position relative to the clamping ring.

17. An apparatus as set forth in claim 16 wherein the actuating means comprises a screw.

18. An apparatus as set forth in claim 16 wherein the actuating means comprises a fluid controlled device.

19. An apparatus as set forth in claim 16 wherein the actuating means comprises an actuating spring.

20. An apparatus as set forth in claim 19 wherein said actuating spring is comprised of a multiple plate spring.

* * * * *